Figure 1:
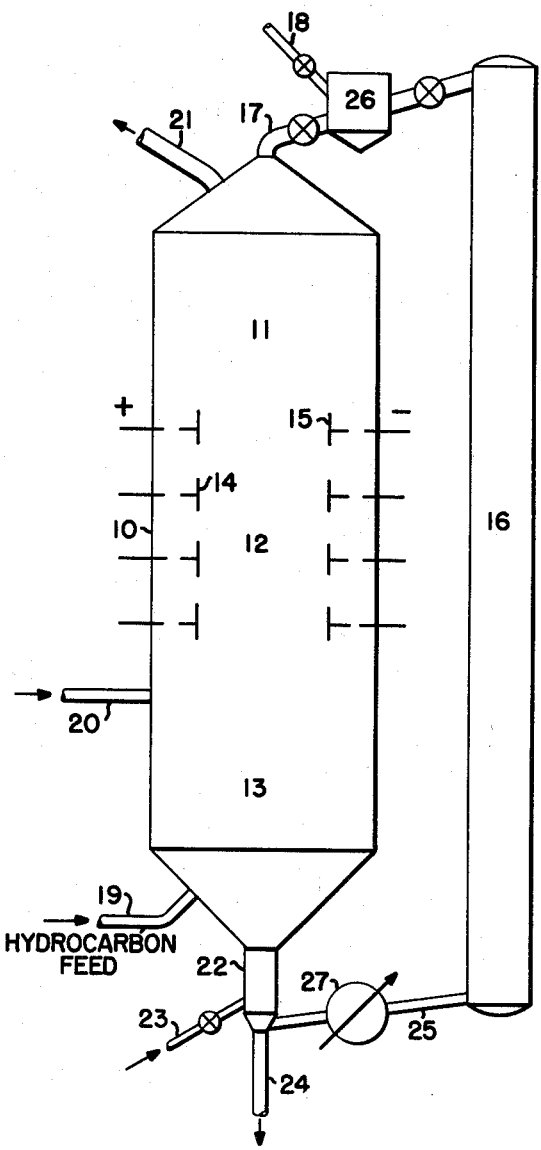

Dec. 29, 1964   C. E. JAHNIG ETAL   3,163,496
HYDROCARBON CONVERSION PROCESS
Filed March 8, 1961   3 Sheets-Sheet 1

Charles E. Jahnig
Peter L. Silveston    Inventors
Charles W. Tyson

By *[signature]*

Patent Attorney

Charles E. Jahnig
Peter L. Silveston   Inventors
Charles W. Tyson

By *[signature]*   Patent Attorney

Dec. 29, 1964  C. E. JAHNIG ETAL  3,163,496
HYDROCARBON CONVERSION PROCESS
Filed March 8, 1961  3 Sheets-Sheet 3

Charles E. Jahnig
Peter L. Silveston   Inventors
Charles W. Tyson

By *George J. Silhany*   Patent Attorney 3,163,496
HYDROCARBON CONVERSION PROCESS
Charles E. Jahnig, Rumson, Peter L. Silveston, Warren Township, Union County, and Charles W. Tyson, Summit, N.J., assignors to Esso Research and Engineering Company, a corporation of Delaware
Filed Mar. 8, 1961, Ser. No. 94,309
4 Claims. (Cl. 23—212)

The present invention is concerned with more effectively subjecting hydrocarbons to high temperature conversions. More particularly, it deals with converting feed stock into light products and high-grade coke by contact with an electrically heated, dense mass of solid particles.

Numerous methods for converting petroleum fractions into light gasiform products, e.g., hydrogen, have been advanced in the art. While, for example, the breakdown of methane or refinery tail gas to hydrogen and coke is a well-known chemical reaction, the elevated temperatures required for desirable yields result in relatively high costs for supplying requisite thermal energy. Thus, numerous processes which might have been theoretically sound are impractical when analyzed from a commercial viewpoint.

The present invention teaches a method of subjecting hydrocarbon feed to high temperature conversion, e.g., 1800–3000° F., in areas where the cost of electric power is relatively cheap, e.g., 6–7 mils/kwh. The system employed is characterized by a high degree of flexibility and stability as well as low investment and operating expense. In accordance with the present invention, hydrocarbon feed stocks are contacted with an electrically heated, dense bed of solids maintained at a reaction temperature. The solids are heated by a controlled electrical potential or voltage applied across one or more portions of the solids bed, the resistance of the solids to electrical flow resulting in their being heated to desired temperatures. The magnitude of the electrical potential or voltage is normally within the range of .1 to 1000 volts/inch, preferably 3–10 volts/inch for the embodiment in FIG. 1 and within the preferred range of about 10–100 volts/inch for the embodiment of FIG. 3, and is controlled to cause resistance heating of the solids without resulting in electrical spark discharges within the solids mass.

It is to be clearly noted that the hot, bed solids themselves, and not electrical spark discharges, serve as the active reaction sites. The hydrocarbon feed upon contact with the thus heated solids is converted into light vapors, e.g., $H_2$, and carbon which deposits on the bed solids. Both the vapors and the carbon-coated solids are recovered as products, the latter normally being a high quality electrode grade coke material.

In one form of the invention, a high degree of thermal efficiency is maintained by utilizing a circulating stream of particles to preheat the hydrocarbon feed and to cool the vaporous effluents of the reaction zone while being preheated themselves for subsequent heat exchange. The energy requirement for the process is thus reduced to essentially that required by the basic thermodynamic relationship between feed and products.

In this embodiment of the present invention, it has been found that there exists a small range of particle recycle rate per unit of hydrogen production which offers minimum energy requirements for the over-all conversion system. It has been unexpectedly found that the solids recycle rate may be allowed to vary within this range, i.e., 42 to 56 lbs. per thousand cubic feet of product hydrogen, without increasing the energy requirements of the system from its minimum value.

It is to be emphasized that since the present invention utilizes solids heated by their electrical resistance rather than spark discharges as the active sites of reaction numerous advantages are secured. The present process may operate in any dense solids phase whereas "spark reactions" require specific solids density conditions, generally set by a particular range of fluidizing gas velocities. Voltages used in the present process are considerably lower than the 3000–4000 volts/inch employed in "spark conversions," thus resulting in lower energy requirements. Additionally, carefully controlled current distribution, an essential element and distinct problem of a spark discharge system is of relatively little importance in the present process, thus making for greater simplicity of operation. Since gasiform reactants and products serve to uniformly distribute heat to the bed solids which are the centers of reaction, current distribution offers few difficulties.

The solids employed are generally inert, coke particles being particularly preferred when a high valued solid product is desired. In some operations and in one form of the invention, two types of particles may be employed. Carbonaceous solids may be utilized in the reaction zone, and a circulating stream of heat carrier, such as metallic or ceramic beads, sand, graphite, etc., used to recover heat from the effluent of the reaction zone, the heat being utilized to preheat the hydrocarbon feed passing to the reaction zone or conversion vessel. The heat carrier solids are preferably of larger size than the solids in the reaction zone.

The present system is particularly suited to the processing of gasiform hydrocarbon feeds since such feed materials may be readily heat exchanged with the reaction solids. However, liquid feed materials, e.g., naphtha, may be employed by suitable modification of the heat exchanging steps.

The various aspects of the present invention will be made more clearly apparent by reference to the following description, examples and accompanying drawings.

FIG. 1 depicts a single vessel system for converting hydrocarbons by the use of an electrically heated moving bed of solids.

Figure 2:
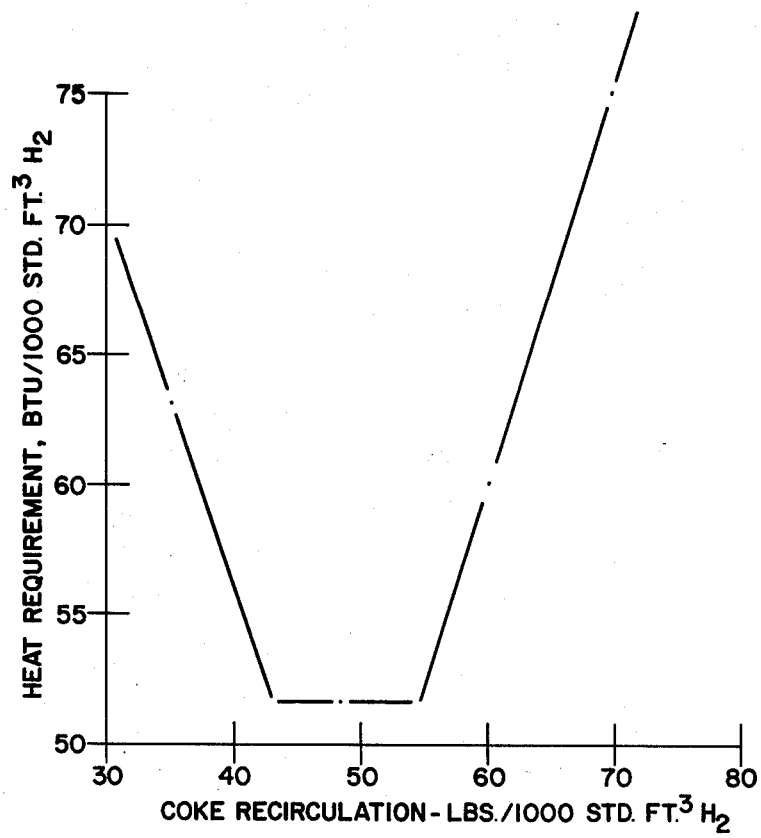

FIG. 2 delineates the unexpected relationship between solids recycle rate and energy requirements of the overall system.

Figure 3:
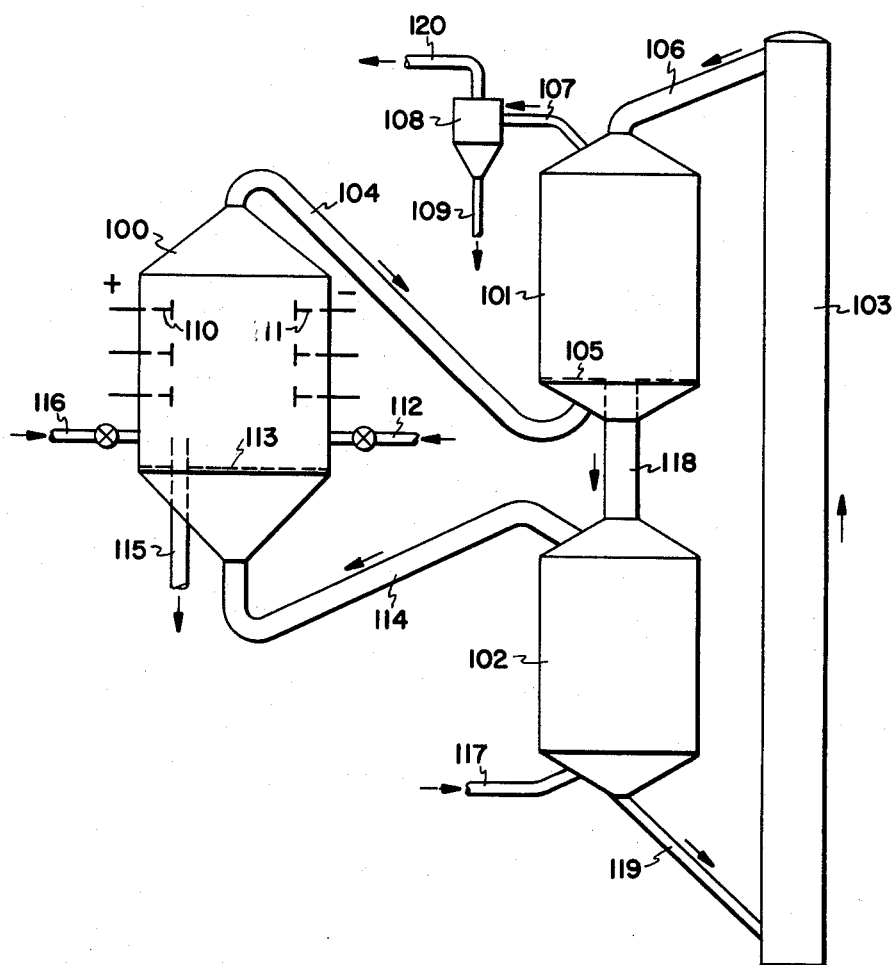

FIG. 3 illustrates a multi-vessel system.

Turning to FIG. 1, there is shown a relatively simple system, both in cost and ease of operation, for converting hydrocarbon feeds at high temperature. Principal vessel 10 consists of three major zones: solids preheat-gas product quenching zone 11, thermal cracking zone 12, and hydrocarbon preheat-solids product quenching zone 13. Vessel 10 is an elongated unit having a diameter of 10 feet and a length of 32 feet, 10 feet of which makes up reaction zone 12. Zones 11 and 13 are 7 feet and 15 feet long, respectively. The length of the reaction zone (and thus the reaction time) is determined by the arrangement of the electrodes. In the example described, electrode pairs are spaced every one to two feet along the reaction zone. While a horizontally spaced relationship is shown, the electrodes may be longitudinally positioned with respect to vessel 10. An electric potential is impressed across the electrode pairs. For convenience, the positive and negative electrodes are designated 14 and 15, respectively. The potential or impressed voltage may arise from an A.C. or D.C. source, a transformer or the like being used to step up or step down the source voltage, if necessary.

Within vessel 10, a relatively compact mass of coke particles is passed downwardly through zones 11, 12 and 13. The solids are maintained in the form of a dense, moving bed having a density in the range of 40 to 75, e.g., 64 lbs./ft.$^3$. The coke generally ranges from about 0.05 to 1.0 inch in size, the bulk of the solids being approximately 0.25 of an inch in diameter.

The solids are introduced into the upper portion of unit 10, as will later be further described, and pass downwardly through zone 11 into zone 12 at an over-all rate of 9–10 ft./hr., in the form of a gravitationally flowing fixed bed. In zone 11, the relatively cool solids undergo heat exchange with the hot upflowing gaseous products of reaction zone 12, the solids thus being heated to a temperature of about 2050° F. while cooling the vapors to a temperature of about 130° F.

In the example described, it is desired to convert methane to hydrogen and high quality coke. The methane may be either in the form of natural gas or refinery tail gas. The feed gas is normally scrubbed prior to reaction, by means not shown, to remove $H_2S$ and $CO_2$ which might contaminate the hydrogen product stream. Additionally, minimization of sulfur in the feed stock will give a higher quality coke product.

Assuming it is desired to produce about 20 million standard cubic feet of hydrogen per day, approximately 10.5 million standard cubic feet of methane per day are introduced through line 19 into the lower portion of vessel 10, i.e., zone 13. Vessel 10 operates at a pressure of about 65 p.s.i.g. The methane, initially at ambient temperature, is preheated to a temperature of 1700–1800° F. by contact with the hot solids leaving reaction zone 12. A small amount of cracking takes place in this zone.

Within thermal cracking zone 12, a voltage is impressed across the electrode pairs and the moving solids bed flowing between them. The potential applied is such as to cause heating of the solids due to their resistance (coke having a resistance to the flow of electricity of about .003 to 0.03 ohm/in.$^3$), without causing appreciable electrical spark discharges through the reaction vessel. When using carbonaceous matter as the contact solids, a voltage of about 3 to 10 volts/inch is prefereably employed to raise the temperature of the solids to about 1900 to 2500° F. The electrical potential utilized will vary with conductivity of the solid, the cracking desired per unit volume, the reaction temperature, etc. Broadly, it will range from about 0.1 to no more than 1000 volts/inch.

In the examples described, the reaction zone operates at 2150° F., a voltage of 3.2 volts/inch being applied between electrodes. Approximately 30 kwh. per 1000 standard cubic feet of methane feed is consumed as the methane is converted to a high yield of $H_2$. Contact time in zone 12 is about 2–3 seconds and the conversion is 95%, producing a gas stream containing 97.5% hydrogen. Due to the high thermal efficiency of the process, the above energy requirement is to be compared with the figure of 24 kwh. theoretically required for the same degree of conversion of 1000 cubic feet of methane.

As the methane is pyrolyzed to hydrogen by contact with the thus heated moving coke bed, carbonaceous matter is simultaneously being deposited on the contact particles. Since it is normally desired to use coke produced by the process as the contact solids, the ultimate solid product of the process is a large homogenous coke particle suitable for electrode manufacture. It normally will have a resistivity of about 0.030–0.10 ohm/in. for the product in powder size smaller than about 1000 microns and a resistivity of about .003–.01 for a product size of about ¼ inch; particle density of 110 lbs./ft.$^3$ and an X-ray diffraction pattern similar to fluid coke.

Carbon is continuously laid down on the contact solids.

In order that a relatively constant size distribution be preserved, a portion of the circulating solids is normally subjected to size reduction and/or replacement with freshly added, relatively smaller "seed" particles. Solids size reduction is conveniently done in section 22 of vessel 10 by the used of jets introduced through one or more lines 23. The grinding gas may be hydrogen or methane. Alternatively, size reduction may be accomplished in a distinct vessel by numerous means, e.g., impact against a target, well known to those skilled in the art of solids size reduction.

Coke particles are withdrawn by line 24 as a product. Of course, coke product may be removed from other parts of the system. The coke is a high-grade carbon finding use as electrodes in metallurgical industry and as raw material in calcium carbide or phosphorus manufacture.

It is highly preferred to recirculate the relatively cool (600° to 900° F.) coke particles withdrawn from the lower portion 22 of the conversion vessel in the manner hereafter described, the most effective utilization of process heat thereby being realized.

Approximately 75 to 80% of the solids passing through the reaction zone are ultimately circulated to gas product cooling zone 11. The solids are passed by line 25 from section 22 to lift 16 wherefrom they may be returned to the upper portion of unit 10. Unit 16 is preferably a pressurized bucket lift, although a screw or piston feeder or the like may be alternatively employed.

The solids, which have been cooled by heat exchange with the methane feed in zone 13, are thus circulated to product gas cooling zone 11 by line 17. The cool solids quench product gases while being preheated for flow into the reaction zone wherein they serve as reaction sites. It is usually advantageous to position a small storage hopper 26 in line 17 for smoothing out solids flow to the conversion vessel. Conduit 18 serves as a means of adding fresh solids to the stream passing to vessel 10, as well as a convenient means of altering solids flow rates by withdrawing a portion of the circulating solids.

The circulating coke particles may be distributed across the cross section of the various treating zones by numerous means, not shown, such as a grid member. Uniform flow may be maintained in the vessel with the help of similar members.

Generally, it is desirable to employ cooler 27 for treating the coke being passed to zone 11. This may be a simple water spray. While the cooler is shown as positioned in line 25, it may be placed in other portions of the recycle circuit. Additional cooling of the recycle solids is particularly desired where the hydrogen product gas is to be compressed. Though less desired, the cooling step may be omitted.

It would, at first examination, be reasonable to expect that the over-all efficiency (energy consumption) of the system might vary with the solids rate through the moving bed reaction zone (essentially the solids recycle rate). However, it has now been surprisingly found that there is a range of solids rate not only in which a minimum energy consumption is to be found, but over which the solids rate may vary while still giving the same minimum heat requirement.

Generally speaking, the optimum solids rate may be calculated from over-all heat balances and balances across the preheat and heat recovery zones at a fixed reaction temperature. If the solids rate is too low, the feed is not sufficiently preheated; while if it is too large, the solids passed to zone 12 are not sufficiently preheated.

Unexpectedly, there is more than one point of maximum efficiency but rather a definite continuous range of solids rates within which energy requirements are maintained at a minimum. This is illustrated in FIG. 2, the pertinent plotted points of which are indicated in the following table. The solid particles are coke, both the initial methane feed and the recycled solids being maintained at ambient temperatures. The reaction zone is at a temperature of about 2100°–2200° F. Relatively long contact times are employed.

*Table 1*

| Coke Rate, Lbs./Thousand Cubic Feet of Hydrogen Product | Energy Requirement, B.t.u./Thousand Cubic Feet of Hydrogen Product | Percent Increase |
|---|---|---|
| 35 | 63,100 | 22 |
| 42.6 | 51,600 | -------- |
| 48 | 51,600 | -------- |
| 54.5 | 51,600 | -------- |
| 60 | 59,800 | 16 |
| 70 | 75,000 | 45 |

As seen from the above table and the graph of FIG. 2, coke rate may be varied over a definite range, i.e., about 42 to 56 lbs./thousand standard cubic feet of hydrogen, while still preserving optimum thermal efficiency.

Thus, the present system is particularly advantageous in that moderate fluctuations in flow do not reduce efficiency and local variations in feed and coke flow rate over the cross-section of the contact vessel are not very serious. Optimum conditions are therefore readily obtained.

Tabulated in Table 2 is a compilation of pertinent data with respect to the over-all system described above.

*Table 2*

|  | Broad Range | Preferred Range |
|---|---|---|
| Reaction Temperature, ° F | 1,800–3,000 | 1,900–2,500 |
| Solids Rate, lbs./thousand ft.$^3$ of Hydrogen | 35–70 | 42–56 |
| Voltage Across Electrodes, volts/in | 0.1–1,000 | 3–10 |
| Reaction Residence Time of Gas, sec | 0.5–20 | 2–5 |
| Solids Size, Inches | 0.05–1.0 | .18–.4 |

Numerous modifications may be made to the system heretofore discussed. A portion of the hot gaseous product, e.g., hydrogen, may be recycled to serve to heat the incoming feed. This is particularly desirable when the feed is a liquid, the hydrogen serving as a vaporizing medium. Further, additional feed inlets such as conduit 20 may be employed for controlling the degree of feed preheat as well as permitting the use of one or more types of feed materials to be employed. Thus, both liquid and gaseous feeds may be simultaneously processed. Another modification of the present invention includes a high temperature soaking zone which treats the coke product of the primary cracking zone to improve its electrical and mechanical properties. Though not normally desired, the system may be altered so that downflowing feed contacts upwardly moving solids, a screw or piston feeder replacing the bucket lift previously described. As will be further detailed below, several distinct vessels may be employed for the various heat treating steps.

The use of a moving bed of solids passing through the reaction zone is advantageous in that it permits relatively high gas velocities to be employed as well as not requiring fine solids. There is no problem of recovery of entrained fines, and there is little or no difficulty due to maintenance of requisite solids size distribution.

The present invention may utilize a relatively dense fluidized bed in one or more of the treating zones. FIG. 3 is specifically directed to such a system. In this form of the invention the hydrocarbon feed may be gaseous or liquid and this form of the invention is especially useful for the treatment of heavy or high boiling hydrocarbon oil feeds such as residuum or petroleum residual oil for the production of coke and hydrogen or gas containing a high percentage of hydrogen.

Illustrated therein is a process carried out principally in reactor 100 and heat exchanging zones 101 and 102. The system depicted is substantially the same as that of FIG. 1, with respect to temperatures. The voltages used in the process of FIG. 3 will be higher than that of FIG. 1, that is, for the fluid bed process of FIG. 3 the range will be about 10–100 volts inch whereas that preferred for the moving bed of FIG. 1 will be about 3–10 volts/inch. For the sake of brevity, features common to both systems will not be discussed in detail. It is sufficient to note that electrodes 110 and 111 impress a voltage potential across the solids mass in the vessel 100 sufficient to raise the temperature of the solids to reaction levels, e.g., 2000° F.–3000°F.

The process of FIG. 3 is distinctive in that within reactor 100 solids are maintained in the form of a relatively dense fluidized bed, e.g., at a density of 40 to 80 lbs./ft.$^3$ Fluidizing gas, such as hydrocarbon gas (methane), hydrogen, or an inert gas stream, etc., is introduced by line 112 into the lower portion of reactor 100. The gas may be introduced at high velocities so as to grind the solids, i.e., coke, and thus preserve a particle size distribution suitable for fluidizing. Solids size control may alternately be maintained in numerous other ways, e.g., external attrition, well known to those skilled in the art. The bed consists of solids of about 20 to 200 mesh size. Feed, such as methane or a vaporizable hydrocarbon, is introduced into preheating zone 102 by line 117 and preheated therein up to a temperature such that reaction is not extensive, the preheated gaseous feed stream leaving the top of zone 102 and passing through line 114 into the bottom portion of reactor 100. Grid 113 supports the solids mass in reactor vessel 100 and also acts to distribute feed gas into reactor 100. Line 116 serves as an alternate means of introducing feed to the bottom portion of the reaction zone or vessel 100. Where a nonvaporizable oil feed such as petroleum residual oil is to be cracked, it is introduced through line 116 into the fluid bed in vessel 100.

Preheating of the feed as well as heat recovery from the products is effected by circulating a mass or stream of relatively coarse solids between upper and lower vessels 101 and 102 through vertical passageway or pipe 118 leading from the lower portion of vessel 101 to the upper portion of vessel 102. The solids passing down through vessel 101 as a moving compact bed recover heat from the hot product gases evolved in the reactor 100 which gases leave overhead through line 104, pass to the bottom portion of top vessel 101 for upward passage therethrough countercurrent to the downflowing compact bed of solids in vessel 101.

The product gases heat up the solids in the downwardly moving bed in vessel 101. The heated solids pass down from vessel 101 through pipe or passageway 118 to vessel 102 and give up their recovered heat to hydrocarbon feed material passing up through vessel 102. Grid or baffles 105 in the bottom portion of vessel 101 serve to distribute hot reaction product gases from line 104 across the horizontal area of the vessel 101. The solids circulating between vessels 101 and 102 can be coke or metallic or ceramic beads or sand or the like. The rate of downflow of solids in vessels 101 and 102 and pipe 118 is between about 40 and 60 lb. coke per 1000 s.c.f. hydrogen product, but may be varied as desired.

The product gases leave reactor 100 through line 104 at a temperature between about 1800 and 3000° F., preferably between about 1900 and 2600° F. and pass to vessely 101. The product gases leave vessel 101 through line 107 at a temperature between about 100 and 600° F., preferably between 100 and 200° F. The preheated moving bed solids leave vessel 101 through line 118 at a temperature between about 1600 and 2800° F., preferably between about 1800° and 2400° F.

The preheated feed leaves vessel 102 through 114 at a temperature between about 900° F. and 2000° F., preferably between about 1200° F. and 1800° F. The moving bed solids leave vessel 102 through line 119 at a temperature between about 100° F. and 600° F., preferably between about 200° F. and 400° F. and are returned to the top of vessel 101 through line 106. They may be cooled if desired or necessary to lower the temperature of the solids to about 50° F.–100° F. passing to the top of vessel 101.

In the specific form of the invention methane is the hydrocarbon feed to be converted to hydrogen and coke. The finely divided solids in reactor 100 are preferably coke particles and more particularly fluid coke particles made in the process itself.

Relatively cool solids are withdrawn from the bottom of the preheater vessel 102 through line 119 and recirculated to the top heat recovery vessel 101 by a bucket lift 103 or the like and conduit 106 in essentially the same manner as described relative to FIG. 1. Generally, moving bed conditions are employed in vessels 101 and 102 in order to obtain countercurrent heat exchange between the gases and moving bed solids.

High-grade coke product in particulate form is withdrawn from the reactor through outlet 115. The coke product is cooled or quenched and may be recovered directly, or without cooling further serve to supply heat to the various flowing gas streams.

Generally, a certain amount of fines solids will be entrained with the product gases passing overhead from reactor 100. Due to the large particle size difference between the entrained fines and the heat carrier-solids in vessel 101 (about 0.25 inch in size), the fine particles pass out of vessel 101 along with the gaseous product stream. The product stream is recovered overhead from vessel 101 through line 107 provided with a cyclone separator 108 or other dust collector to remove fines from the product stream. The fines are recovered through cyclone separator dipleg 109 and may be passed to the reaction zone or otherwise employed. Product gas is recovered overhead from separator 108 through line 120 and passed to conventional purification, i.e., water scrubbing and compression. Since it is not necessary to remove fines from high temperature gases but rather from the cooled gasiform effluent of vessel 101, substantial savings in the size of solids separation facilities and in materials of construction are realized since the volume of the gases to be treated is considerably less, and at a much lower temperature.

Table 3 sets forth data specific to the form of invention shown in FIG. 3.

*Table 3*

|  | Broad Range | Preferred Range |
| --- | --- | --- |
| Reaction Temperature, °F | 1,800–3,000 | 1,900–2,600 |
| Density of fluidized bed in reactor, 100 lbs./cu. ft | 10–100 | 40–80 |
| Voltage across electrodes, volts/in | 0.1–1000 | 10–100 |
| Reaction residence time of gas, seconds | 0.5–20 | 2–5 |
| Solids size in reactor 100 in mesh | 10–400 | 20–200 |
| Solids size, inches, circulating between vessels 101 and 102 | 0.05–1.0 | 0.1–0.5 |
| Pressure in vessel 100 pounds per square inch gage (p.s.i.g.) | 0–3,000 | 50–1,000 |

In an example the reactor operates at a temperature of about 2150° F., and 65 p.s.i.g., the contact time is between about 2 and 3 seconds and the conversion of methane is about 95% to produce a gas stream containing about 97.5% hydrogen. Coke is continuously laid down on the finely divided solids in reactor 100.

Of course numerous other ways of modifying the above systems will suggest themselves to those skilled in the art of both high temperature reaction and solids handling.

Summarily, the present invention offers the following advantages over processes heretofore known in the art.

(1) Effective operation over a wide range of bed densities and under both moving and fluidized bed conditions.

Since the solids, rather than spark discharges, are the sites of reaction, any dense solids phase may be employed.

(2) Lower electrode voltages are required as compared with "arc" processes. Thus, power handling costs may be reduced by an optimum balance between insulating for high voltage and the step down of high voltage power supply.

(3) Virtually complete heat recovery is obtained by the use of circulating solids for product heat recovery and feed preheat. The energy requirement is reduced to close to the heat of formation of the feed material at the reaction temperature.

(4) Flexible operation of capacity since bed density is not critical thus permitting a wide range of gas (feed) velocities to be employed.

(5) Simple recovery of fine particles.

(6) High purity product streams. Coke product is agglomerated in process to desirable size for electrode manufacture.

(7) Flexible re nature of oil feed; can use any hydrocarbon.

This application is filed as a continuation-in-part of Jahnig et al. S.N. 758,498, filed September 2, 1958, now Patent 2,982,622, granted May 2, 1961.

Having described the invention, that which is claimed is set forth in the appended claims.

What is claimed is:

1. A method of converting hydrocarbons at high temperatures which comprises maintaining substantially inert solids in a reaction zone in the form of a dense turbulent fluidized solids bed, applying an electrical voltage across at least one portion of said fluidized solids bed, said voltage having a magnitude sufficient to cause heating of said fluidized solids due to their resistance to the flow of electrical current while being of insufficient magnitude to cause substantial spark discharges in said fluidized solids bed, maintaining a separate circulating stream of heat exchange solids passing through a gasiform product cooler and a hydrocarbon feed preheater in succession, contacting hydrocarbon feed with heat exchange solids in said hydrocarbon feed preheater to preheat said hydrocarbon feed, passing said preheated hydrocarbon feed through said reaction zone to heat said hydrocarbon feed above about 1800° F. to convert said hydrocarbon feed to gasiform product and coke which deposits on said inert solids, withdrawing hot gasiform product overhead and passing it through said gasiform product cooler to preheat said heat exchange solids and cool said gasiform product, circulating heated heat exchange solids from said gasiform product cooler to said hydrocarbon feed preheater to supply heat to said hydrocarbon feed and withdrawing coke solids from said reaction zone.

2. The method of claim 1 wherein said hydrocarbon feed is a light gaseous material, and wherein a voltage of 3 to 100 volts per inch is applied across said fluidized solids bed to heat said solids to a temperature sufficient to convert said hydrocarbon feed to substantial portions of hydrogen and coke.

3. A method of converting hydrocarbons at high temperatures into coke and gasiform reaction products including light hydrocarbon vapors and a substantial proportion of hydrogen which comprises maintaining solid coke particles in a reaction zone as a relatively dense turbulent fluidized solids mass, applying an electrical voltage across at least a portion of said fluidized mass, said voltage having a magnitude to cause heating of said solids to between about 1800° F. and 3000° F. due to their resistance to the flow of electrical current while being of insufficient magnitude to cause substantial spark discharges in said fluidized solids mass, passing a stream of preheated hydrocarbon feed upwardly through said reaction zone for contact with said fluidized solids mass heated to a temperature above about 1800° F., to convert said hydrocarbon feed to coke which deposits on said coke solids and gasiform reaction products including light hydrocarbon vapors and a substantial portion of hydrogen, passing hot gasiform reaction products from said reaction zone to a solids preheating zone separate from said reaction zone for heat exchange with said solids and wherein said heat exchange solids pass down through said solids preheating zone as a moving bed, said solids preheating zone forming part of a separate heat exchange system, withdrawing said gasiform reaction products overhead from said solids preheating zone and removing solids from the bottom portion of said reaction zone, passing preheated solids from said solids preheating zone as a downwardly moving bed to a hydrocarbon feed preheating zone and contacting hydrocarbon feed with said preheated solids to provide said preheated hydrocarbon feed and then returning said heat exchange solids to the top of said solids preheating zone for further circulation.

4. A method according to claim 3 wherein said heat exchange solids are further cooled before being returned to the top of said solids preheating zone.

References Cited in the file of this patent
UNITED STATES PATENTS

| | | |
|---|---|---|
| 2,449,635 | Barr | Sept. 21, 1948 |
| 2,799,640 | Pevere et al. | July 16, 1957 |
| 2,888,395 | Henny | May 26, 1959 |
| 2,982,622 | Jahnig et al. | May 2, 1961 |